United States Patent [19]

Storey

[11] Patent Number: 4,884,138
[45] Date of Patent: Nov. 28, 1989

[54] VIDEO TRANSMISSION SYSTEMS

[75] Inventor: Richard Storey, Newchapel, United Kingdom

[73] Assignee: British Broadcasting Corporation, London, England

[21] Appl. No.: 174,792

[22] PCT Filed: Dec. 23, 1986

[86] PCT No.: PCT/GB86/00797
§ 371 Date: Apr. 4, 1988
§ 102(e) Date: Apr. 4, 1988

[87] PCT Pub. No.: WO88/01462
PCT Pub. Date: Feb. 25, 1988

[30] Foreign Application Priority Data

Aug. 19, 1986 [GB] United Kingdom ............... 8620110

[51] Int. Cl.$^4$ .................. H04N 7/01; H04N 7/12
[52] U.S. Cl. ................... 358/133; 358/138; 358/140
[58] Field of Search ............ 358/138, 140, 12, 133

[56] References Cited

U.S. PATENT DOCUMENTS

| 2,810,780 | 10/1957 | Loughlin | 358/138 |
| 2,921,124 | 1/1960 | Graham | 358/138 |
| 4,389,668 | 6/1983 | Faureau | 358/140 |
| 4,605,950 | 8/1986 | Goldberg | 358/12 |

FOREIGN PATENT DOCUMENTS

| 0033306 | 8/1981 | European Pat. Off. | 358/12 |
| 0057826 | 1/1982 | European Pat. Off. | |
| 0114693 | 1/1984 | European Pat. Off. | |
| 58-55009 | 4/1983 | Japan | |
| 2161669A | 2/1983 | United Kingdom | |

OTHER PUBLICATIONS

Wendlen, Broder, "Extended Definition Television with High Picture Quality", S.M.P.T.E. Journal, vol. 92, No. 10, Oct., 1983.
Arragon, Jean-Pierre, et al., "Transmission d'images de television a haute definition compatible avec le standard D2-MAC/paquet", ACTA Electronica 27,1-2, 1986.
Thomas, Graham A., "HDTV Bandwidth Reduction by Adaptive Subsampling and Motion Compensation Datv Techniques", S.M.P.T.E. Paper at Technical Conference, Oct. 1986.
Ninomiya, Yuichi, "A Single Channel Broadcast System—The Muse", NHK Laboratories Note, Sep., No. 304, Japan, 1984.

Primary Examiner—Howard W. Britton
Attorney, Agent, or Firm—Robert F. O'Connell

[57] ABSTRACT

An HDTV video signal with 1249 lines per picture is transmitted over a transmission channel designed for 625 lines per picture by transmitting alternate samples of two lines of the 1249 line signal on a single line of the 625 line signal. An HDTV receiver can interpolate to give a 1249 line picture but a 625 line receiver will still receive a signal that is adequately compatible to give a display.

13 Claims, 7 Drawing Sheets

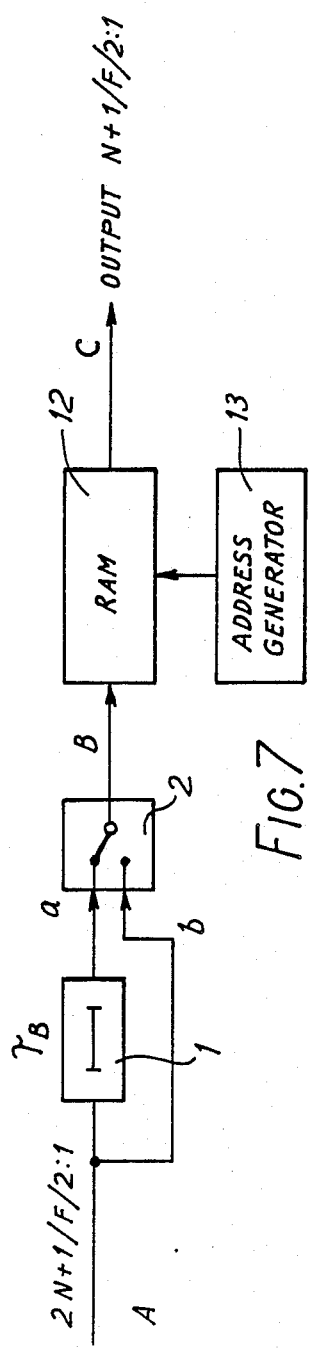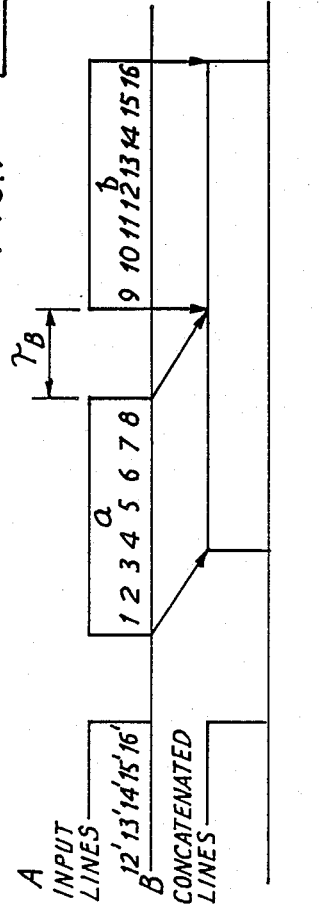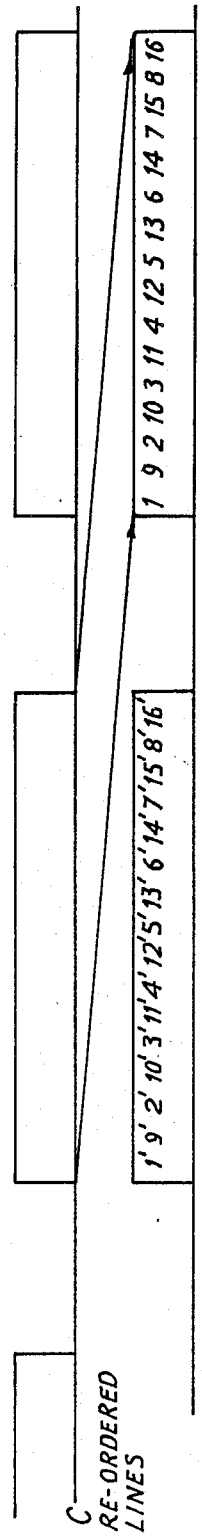

VIDEO TRANSMISSION SYSTEMS

BACKGROUND OF THE INVENTION

This invention relates to a method of transmitting a video signal at a higher line standard over a transmission channel for signals at a lower standard, and to transmitting and receiving apparatus for use in the method.

Various methods have been proposed for transmitting high definition images, at a reduced bandwidth, but at the same basic line rate as is used for source and display. One example of this type of system is NHK's "MUSE", which operates entirely at 1125 lines. Other techniques have been proposed for packing extra spatial detail, but usually less than is claimed for HDTV ("high-definition television"), into a standard channel such as C-MAC or D2-MAC. These two approaches are described respectively the following papers, (1) Ninomaya, Y. et al. 1984. A single Channel HDTV Broadcast System - The Muse. NHK Laboratory Note No 304, and (2) Arragon, J-P. et al. 1986. Transmission d'images de Television a Haut Definition Compatible avec le Standard D2-MAC Paquet. Acta Electronica 27,1–2.

SUMMARY OF THE INVENTION

In one aspect the invention provides a method of transmitting a video signal originating at a relatively higher line standard (lines per picture) over a transmission channel for signals at a lower line standard by transmitting samples of more than one line of the higher standard on a single line at the lower standard. A receiver capable of receiving signals at the higher standard can separate out the samples to reconstruct the higher standard, while a receiver capable of receiving only signals at the lower standard will still receive a workable signal. A degree of compatibility is thus retained.

The invention in its various aspects is defined in the appended claims.

BRIEF DESCRIPTION OF THE DRAWINGS

The invention will now be described in more detail by way of example with reference to the accompanying drawings, in which:

FIG. 7 is a block circuit diagram of a sample shuffler using one RAM circuit; and FIG. 8 is a diagram similar to FIG. 6 for the circuit of FIG. 7.

DETAILED DESCRIPTION OF THE PREFERRED EMBODIMENTS

This specification describes a method of allowing transmission of 1249-line HDTV resolution signals via a 625 line based trnasmission channel.

Figure 1:
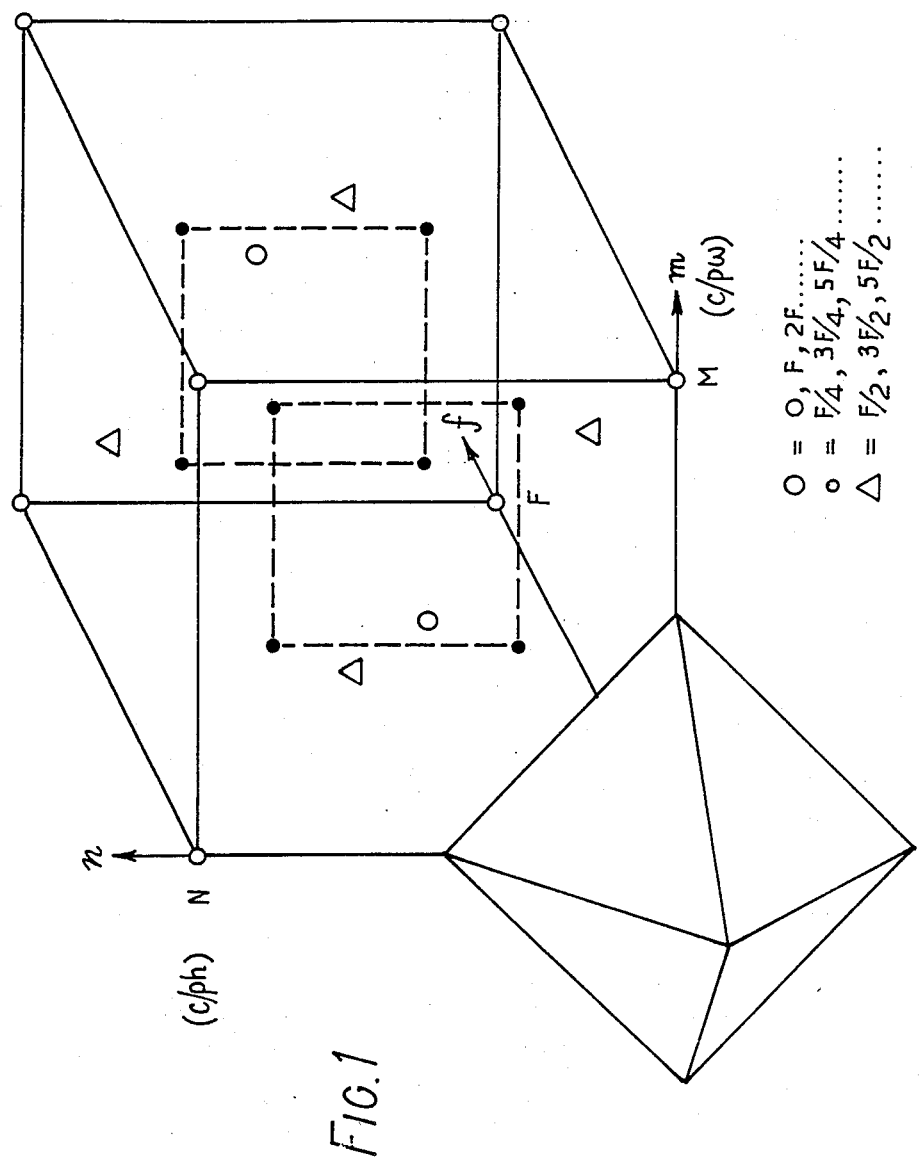
FIG. 1 is a diagram illustrating the bandlimiting provided in a bandwidth compression prefilter in three dimensional space for stationary picture areas (or well-correlated moving areas)
Figure 2:
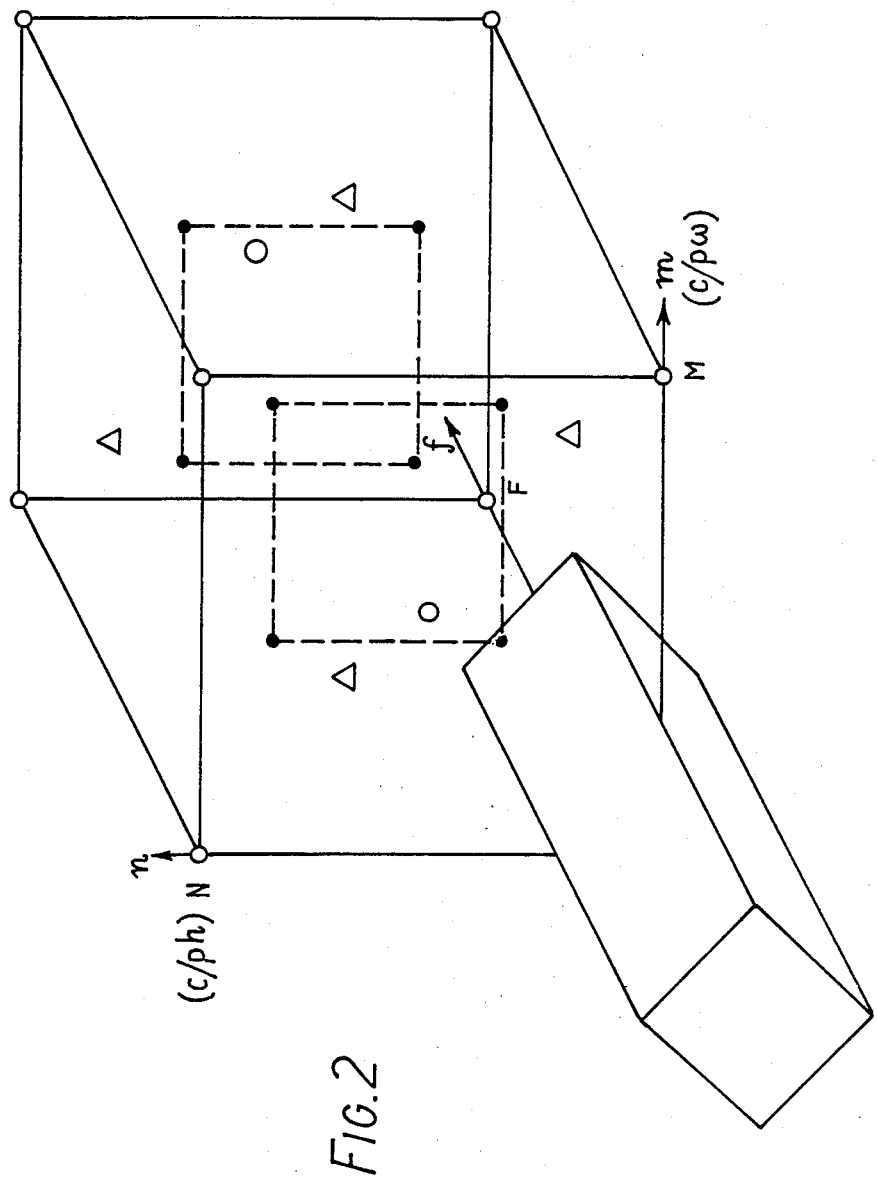
FIG. 2 is a diagram similar to FIG. 1 for areas in which uncorrelated movement occurs.

In implementing the method the first operation is to bandwidth reduce the signal. This operation can be done by applying pre-filters as shown in FIGS. 1 and 2 to stationary and moving areas respectively. FIGS. 1 and 2 illustrate the band limiting applied in a three-dimensional space having a horizontal frequency axis n in cycles per picture width (c/pw), a vertical frequency axis n in cycles per picture height (c/ph) and a time axis f related to the field frequency. The stationary area filtering is defined by the octohedral shape shown in FIG. 1 which has apices half-way along the m and n axes to the next repeat and only a quarter of the way along the f axis. In the moving-area filter characteristic defined by the cuboid shape in FIG. 2, the filter surface intersects the m and n axes one quarter of the way along while the f axis is intersected half-way along. A movement detector is used to apply the characteristic of FIG. 2 in areas of movement and the characteristics of FIG. 1 in stationary areas.

An added level of sophistication is to add motion vector measurement and compensation as described in our British Patent Application 86 17320 and in a paper read by THOMAS, G. A., at the 128th SMPTE Technical Conference, 24–29 Oct. 1986, New York, Preprint No. 128–49 to extend the spatial detail available from the pre-filter of FIG. 1 to all well-correlated moving areas. The use of motion vector compensation will be highly desirable in a fully matured bandwidth reduction system since the eye's visual acuity for tracked motion, at the speeds commonly encountered in television (say a maximum of 10 degrees/sec), is little different from its value for stationary detail.

Figure 3:
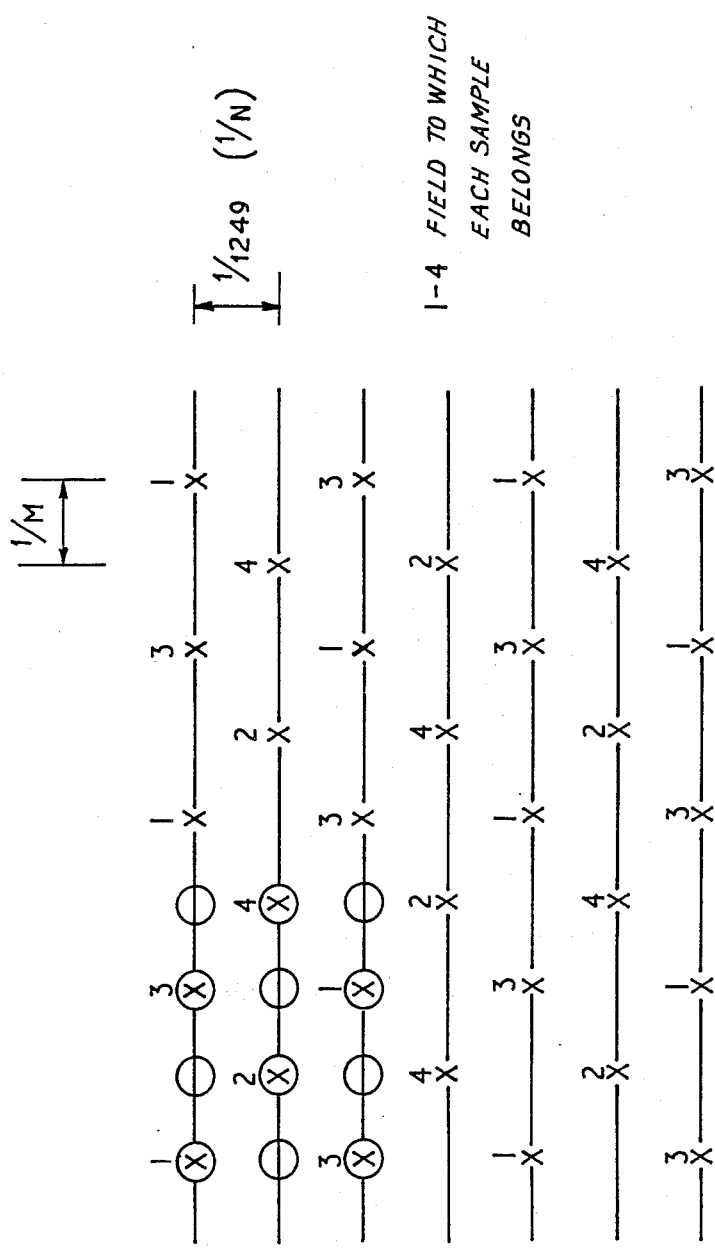
FIG. 3 is a diagram illustrating the sampling structure for a 4:1 bandwidth reduction.

The second step is to re-sample each of the pre-filtered signals at a lower rate, in a way which avoids spectral overlap in critical areas and packs the resulting repeat spectra neatly into the available space. A suitable sampling structure, in which a 4:1 reduction is achieved by spreading the transmission over four fields rather than the normal two, is shown in FIG. 3. Other structures could be used. Prior to re-sampling or sub-sampling samples occur on each picture at each of the points marked 0 in the top left-hand corner of FIG. 3. However, in this example a 4:1 or 8:1 reduction is obtained (depending upon whether the 1249 line signal is interlaced or sequential) by only transmitting the samples marked with the numbers 1 to 4, and in particular on field 1 only transmitting the samples marked 1, etc. This sub-sampling operation is in fact similar to that used in "MUSE", mentioned above, for example. The sub-sampling is of course the same whether the filter characteristic of FIG. 1 or that of FIG. 2 is being used. Note that this structure is not directly suited to transmission in a 625 line channel.

The sub-sampling causes repeats of the frequency spectra in the three-dimensional space of FIG. 1 and 2. The filter characteristic shapes are such that when repeated the filter pass bands, i.e. the volumes defined by the shapes, do not overlap.

Figure 4:
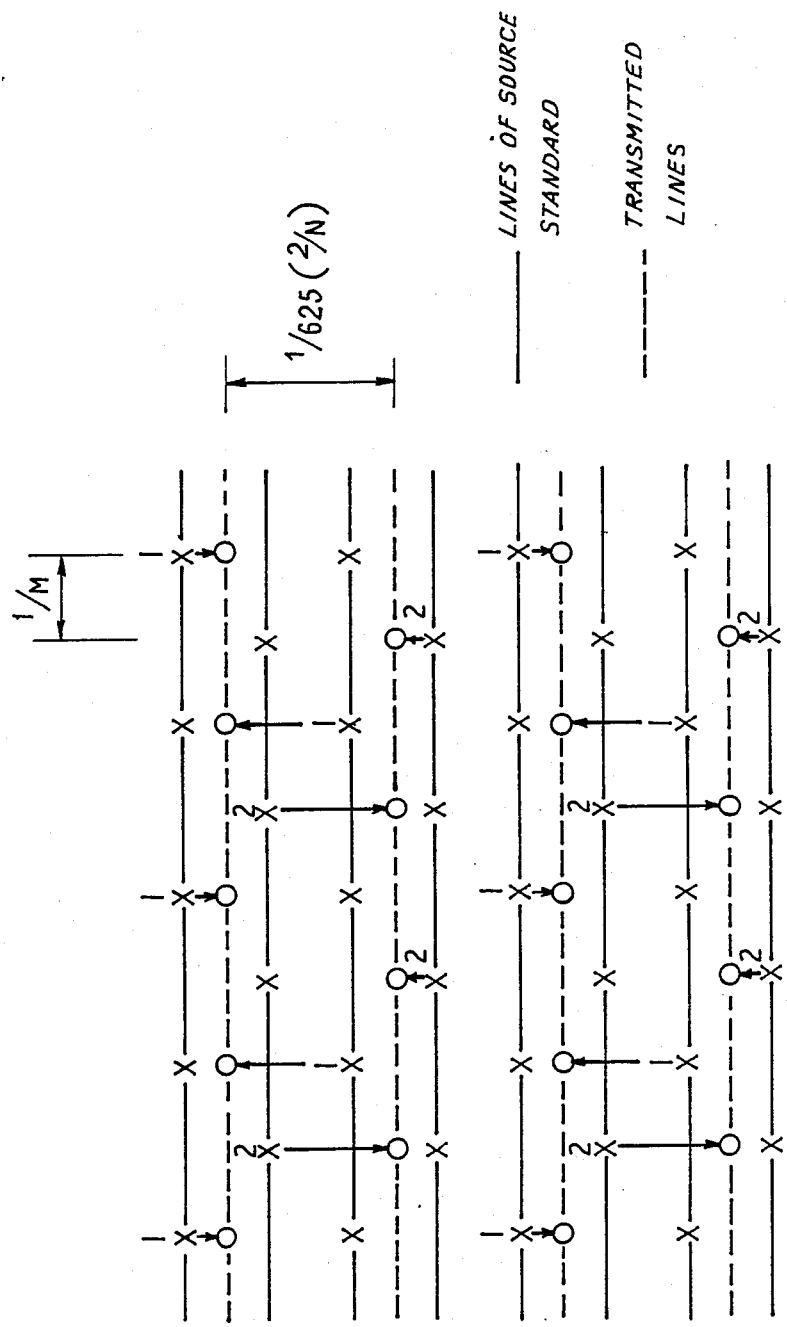
FIG. 4 is a diagram illustrating the subsequent re-ordering of the samples to produce a signal for transmission at standard e.g. 625 line rate.

In the third step the samples are re-organised for transmission by vertical re-positioning. This line standard conversion operation is illustrated in FIG. 4 for the first two fields in the four field sequence. All the samples from lines 1 and 3 of the 1249 format which are transmitted on field 1 are now transmitted on line 1 of the 625 format. The following two fields are treated in exactly the same manner. In this way, twice the number of samples can be packaged into half the number of transmitted lines, to form a 625 line based system.

Using this packaging scheme, an HDTV receiver equipped with a picture store can re-position the samples before interpolation, to produce a high definition image as before. In other words the HDTV receiver can undo the positioning operation of FIG. 4 to redistribute the field 1 samples back between lines 1 and 3 of the 1249 line format.

At the same time, a conventional 625 line receiver would doubtless produce a recognisable picture, without the need for a display up-converter. There would however be aliasing additional to that caused by the bandwidth reduction system alone. We believe it likely that the total aliasing would not be significantly worse than that arising from the spectral folding in stationary and well-correlated moving areas introduced by the bandwidth compression.

Figure 5:
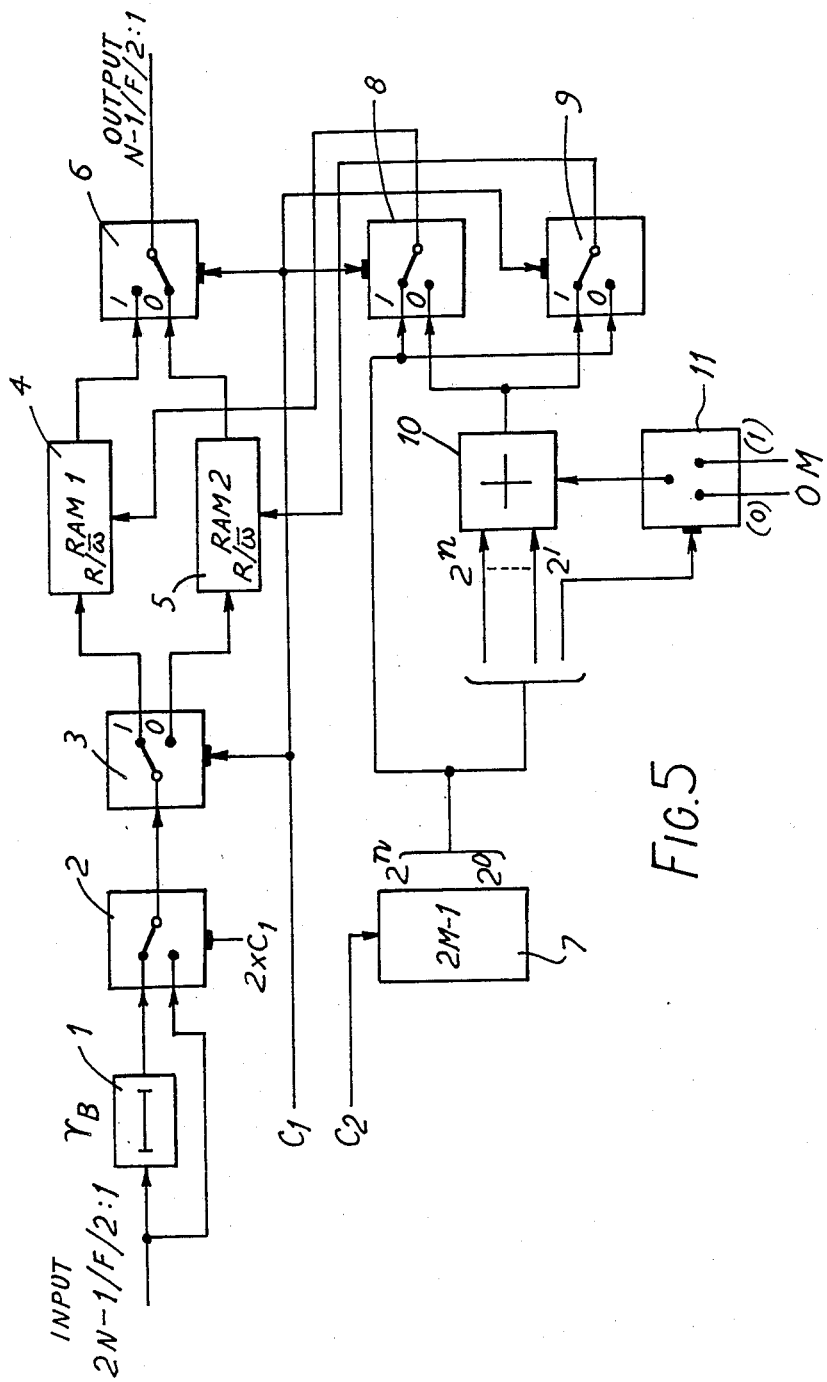
FIG. 5 is a block circuit diagram of a circuit which can be used at the transmitter to re-order or "shuffle" the samples, using two RAM stores.

FIG. 5 shows in block schematic form a circuit for vertical re-positioning of the samples as illustrated in FIG. 4. The circuit of FIG. 5 uses two RAM stores 4,5 and a simple address generator.

Figure 6:
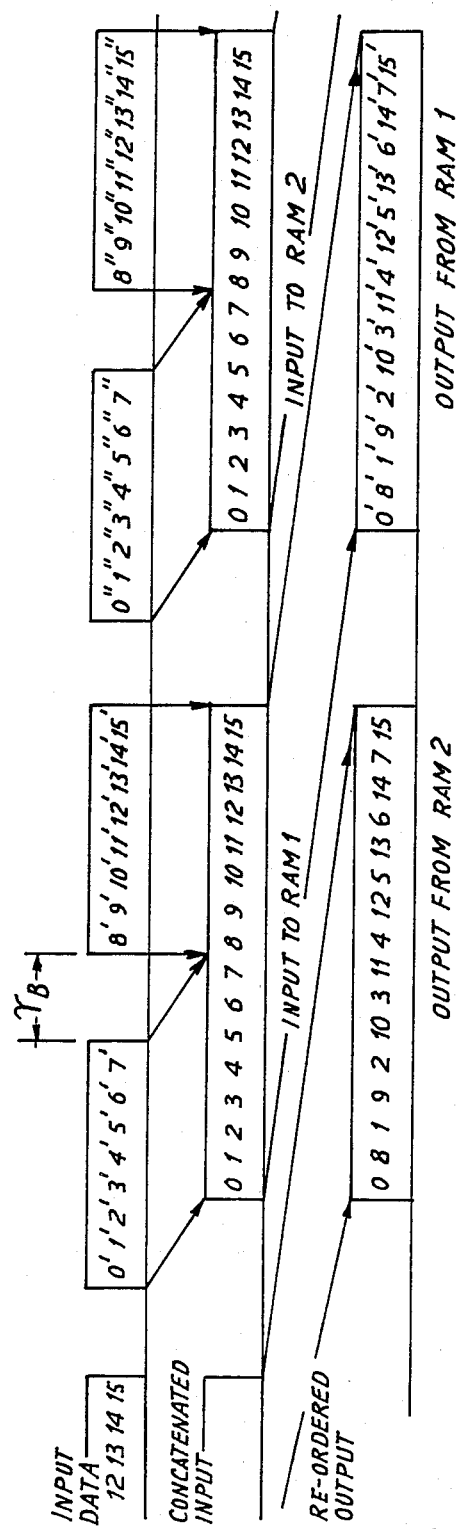
FIG. 6 is a diagram illustrating the sample shuffling with the circuit of FIG. 5 on an illustrative line having only eight samples.

In FIG. 5 the appropriate samples from two consecutive input lines are concatenated by means of a delay 1 of a length equal to the link blanking period of the incoming vision signal, as shown in FIG. 6, and a selector switch 2. These newly concatenated lines are written alternately into the RAM stores 4 and 5 by means of distributor switch 3. When the first RAM 4 is being written into, the second RAM 5 is being read from, and vice versa. The appropriate output data is selected by a switch 6 which operates in antiphase to switch 3.

A counter 7 generates a basic address sequence of length 2M where M is the number of samples per input line. Thus counter 7 counts from zero to 2M-1. This basic sequence is used to address whichever RAM is currently being written into. Address routing is achieved by switches 8 and 9. A modified address sequence is required to read samples from the RAMs with the appropriate re-ordering. This sequence is generated by an adder 10 and a switch 11. The monotonic address sequence from counter 7 is divided by two by bit shifting to give a count which increments for every second sample. The least significant bit is now used to control switch 11 which feeds a zero to adder 10 when the bit is a logic low and the number M when it is a logic high. Thus all even addresses are halved, and all odd addresses are halved and increased by M.

FIG. 6 shows that this is the required form of re-positioning or "shuffling" for the samples. FIG. 6 is described in relation to a line length of only 8 selected samples, purely as a simple illustration.

FIG. 7 illustrates an alternative configuration using a single RAM store 12 and a more complex address generator 13. The RAM store performs a read operation immediately followed by a write to the same address, as shown in FIG. 8. It follows that the address sequence must be modified for each successive output line in order for the output samples to appear appropriately shuffled. This string of address sequences does repeat however, but the repeat period is dependent upon the number of samples per output line. Active line lengths for CCIR recommendation 601 and the MAC transmission standard are 720 and 697 samples respectively. An output line length of 720 samples repeats after 358 lines, and a line length of 698 samples repeats after 39 lines (697 has an enormously long repeat period, probably because its two factors 17 and 41 are both prime numbers). The address generator will therefore be more complex than for the previous example though there are savings in RAM storage.

In the decoder, circuits similar to FIG. 5 or FIG. 7 can be used with the delay 1 and switch 2 transferred to the output of the circuit. The commutation must be approximately rephased, in FIG. 5 by reversing the polarity of the switches 2, 8 and 9, and in FIG. 7 by using a converse address generator 13.

In summary, a method is proposed for the transmission of a 4:1 bandwidth reduced television signal, having a resolution approaching that of a 1249 line source standard, through a 625 line based transmission channel. The performance of a HDTV receiver is not compromised by re-packaging the transmitted information, nor is the complexity of the receiver significantly increased.

A recognisable picture should be produced when a conventional receiver is fed directly with the bandwidth reduced signal. There will however be a degree of moving alias while the encoder is applying the high spatial detail pre-filter of FIG. 1a. This aliasing will therefore be confined to stationary and well correlated moving areas. It appears that the additional aliasing caused by re-packaging the signal for transmission via a 625 line based channel, will be negligible compared to that caused by not using a suitable post-filter.

While the invention has been described in terms of a 1249 line HDTV signal and a 625 line based channel it will be appreciated that it is not limited to such numerical values. Also it may be employed in bandwidth reduction such as recording and the terms "transmission" and "transmission channel" should be construed accordingly.

I claim

1. A method of transmitting a video signal originating at a relatively higher line standard over a transmission channel for signals at a lower line standard, comprising reducing the bandwidth of the higher line standard signal to one quarter of that of the higher line standard signal, collapsing two lines of the bandwidth reduced signal into a single line of the lower standard and transmitting samples at substantially a quarter of the bandwidth of the higher line standard, the samples being so formed as not to prejudice the ability of the bandwidth reduction decoding process to resolve the full resolution of the original higher line standard signal.

2. A method according to claim 1 wherein the higher line standard sigal is prefiltered and then quincuxially resampled at a lower rate, the resampled signal being transmitted over twice the number of fields as the prefiltered signal.

3. A method according to claim 2 wherein the samples of the resampled signal are vertically repositioned by moving samples transmitted on alternate lines of a given field to a single line at the lower line standard.

4. Receiving apparatus for receiving a video signal transmitted according to the method of claim 1, comprising input means for receiving from a transmission channel the transmitted video signal at a relatively lower line standard, conversion means for converting the input video signal to a signal at a higher line standard, bandwidth reduction decoding means for expanding the bandwidth of the bandwidth reduced signal, and output means for supplying an output signal at the higher line standard for display or subsequent processing, in which the conversion means comprises means for distributing samples on a single line of the input signal at the lower standard to form the samples for two output lines at the higher standard, each line at the output standard being derived from alternate samples at the input standard and the samples of the received video signals are the resolution of the output standard being formed such that they do not prejudice the ability of the decoding means to resolve the full resolution of the original higher line standard signal.

5. Apparatus according to claim 4, in which the two output lines are adjacent lines in one field of an interlaced signal.

6. Apparatus according to claim 4, in which the conversion means comprises RAM store means and addressing circuitry therefor.

7. Apparatus according to claim 4, including interpolation means coupled to receive the output of the conversion means.

8. Transmitting apparatus for transmitting a video signal comprising input means for receiving an input video signal at a relatively higher line standard, conversion means for converting the input video signal to a signal at a lower line standard, and output means for applying an output signal at the lower line standard to a transmission channel, in which the conversion means comprises means for selecting samples of more than one line of the input signal at the lower standard, the bandwidth of the selected samples being substantially a quarter of the bandwidth of the higher line standard, and the samples being so formed as not to prejudice the ability of a bandwidth reduction decoder in a receiver to resolve the full resolution of the original higher line standard signal.

9. Apparatus according to claim 8, in which the conversion means comprises RAM store means and addressing circuitry therefor.

10. Apparatus according to claim 8, including bandwidth compression means prior to the conversion means and comprising pre-filter means and re-sampling means.

11. Apparatus according to claim 8 in which the re-sampling means includes means for transmitting samples of the re-sampled signal over twice the number of fields as the prefiltered signal, and vertical repositioning means for moving samples transmitted on alternate lines of a given field to a single line at the lower line standard.

12. Apparatus according to claim 8, in which samples from two input lines at the higher standard are used to form a single output line at the lower standard, the samples of the output signal being derived alternately from the two input lines.

13. Apparatus according to claim 12, in which the two input lines are adjacent lines in one field of an interlaced signal.

* * * * *

UNITED STATES PATENT AND TRADEMARK OFFICE
CERTIFICATE OF CORRECTION

PATENT NO. : 4,884,138

DATED : November 28, 1989

INVENTOR(S) : Richard Storey

It is certified that error appears in the above-identified patent and that said Letters Patent is hereby corrected as shown below:

Column 5, line 8, cancel "the resolution of the output standard being".

Signed and Sealed this

Twenty-third Day of April, 1991

*Attest:*

HARRY F. MANBECK, JR.

*Attesting Officer*  *Commissioner of Patents and Trademarks*